(12) United States Patent
Matsuura

(10) Patent No.: US 6,879,557 B2
(45) Date of Patent: Apr. 12, 2005

(54) OPTICAL RECORDING MEDIUM HAVING PITS DISPOSED IN A MATRIX LAYOUT AND APPARATUS FOR PROCESSING THEREOF

(75) Inventor: Michio Matsuura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 10/057,699

(22) Filed: Jan. 24, 2002

(65) Prior Publication Data

US 2003/0051092 A1 Mar. 13, 2003

(30) Foreign Application Priority Data

Sep. 12, 2001 (JP) .................................... 2001-276398

(51) Int. Cl.⁷ .............................................. G11B 7/24
(52) U.S. Cl. ........................ 369/275.4; 369/275.3; 369/44.26; 369/44.42
(58) Field of Search ......................... 369/275.3, 275.4, 369/44.26, 44.42, 44.23, 53.22, 53.23; 428/64.4, 64.1

(56) References Cited

U.S. PATENT DOCUMENTS

| 5,235,576 A | 8/1993 | Shigemori | 369/32 |
|---|---|---|---|
| 5,383,176 A | 1/1995 | Inui et al. | 369/275.4 |
| 5,535,179 A * | 7/1996 | Noguchi | 369/13.24 |
| 5,671,200 A * | 9/1997 | Yamaguchi et al. | 369/44.28 |
| 5,719,835 A * | 2/1998 | Ishika | 369/44.26 |
| 5,805,565 A * | 9/1998 | Miyamoto et al. | 369/275.4 |
| 5,966,357 A * | 10/1999 | Ryoo | 369/53.23 |
| 5,982,738 A * | 11/1999 | Miyamoto et al. | 369/275.3 |
| 6,058,093 A * | 5/2000 | Kato et al. | 369/124.14 |
| 6,272,105 B1 | 8/2001 | Hayashi | 369/275.3 |
| 6,275,466 B1 | 8/2001 | Nagasawa et al. | 369/275.3 |

FOREIGN PATENT DOCUMENTS

JP          10-222847          8/1998

* cited by examiner

*Primary Examiner*—Tan Dinh
(74) *Attorney, Agent, or Firm*—Greer, Burns & Crain, Ltd.

(57) ABSTRACT

An optical storage medium includes a plurality of tracks and a plurality of information pits arranged in the tracks. The information pits are designed to produce reflection light upon irradiation of light. The information pits are disposed in a matrix layout so that the reflection light includes at least four diffracted rays. An information pit is offset from the predetermined reference point in the track direction and the tracking direction. Thus, the particular information pit carries information indicated by the offset position relative to the reference point.

17 Claims, 20 Drawing Sheets

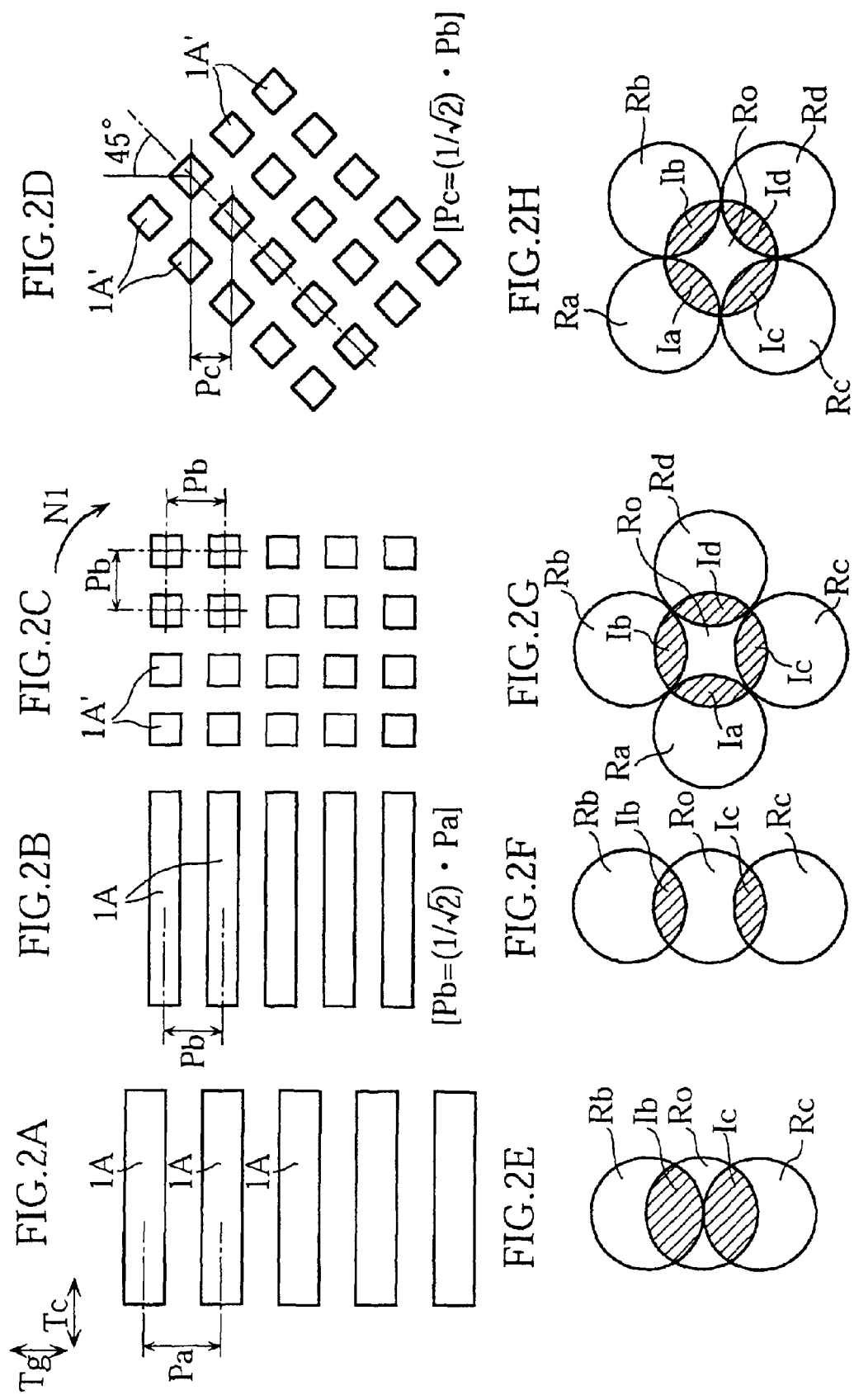

OPTICAL RECORDING MEDIUM HAVING PITS DISPOSED IN A MATRIX LAYOUT AND APPARATUS FOR PROCESSING THEREOF

BACKGROUND OF THE INVENTION

1. Field of the Invention

The present invention relates to a storage medium with which data-recording or data-reproducing (or both) is performed optically or magneto-optically. The present invention also relates to an optical data processor for reading out information stored in such a recording medium.

2. Description of the Related Art

As known in the art, optical disks such as CDs and DVDs are provided with data-recording tracks. Each track extends circumferentially of the disk and is divided into a plurality of sectors. FIG. 20 of the accompanying drawings shows the sector arrangement of a conventional optical disk. As illustrated, each sector includes a data-recording region Z1 and an address region Z2. The data-recording region Z1 is used for data-writing. The recording method to be employed may be magnetic field modulation for example. The data-recording region Z1 is provided with a land L or groove G for the track T.

Referring to FIG. 21, a laser beam striking upon the land L or groove G is reflected and generates an zero-order ray Ro together with two first-order rays Re and Rf. The zero-order ray Ro is a non-diffracted ray that traces the incidence path of the laser beam, while the other rays Re and Rf are diffracted rays of first order that result from the alternate juxtaposition of the lands L and the grooves G in the tracking direction.

As shown in FIG. 21, the zero-order ray Ro interferes with the first-order rays Re and Rf, thereby producing two interference rays Ie and If in the tracking direction. When the tracking operation is not properly performed, the two interference rays Ie~If will exhibit a difference in intensity of light. The conventional tracking control is performed based on the intensity difference between the two interference rays.

The address region Z2 (see FIG. 20) is provided with a fixed record of sector-specific address information. The address information is expressed by convex or con-cave marks or "pits" 90. The mark edge recording format is adopted, where the information pits 90 are modulated in length.

In recent years, the amount of data to be dealt with in computers, communications apparatus, audiovisual equipment, etc. has been increasing. Accordingly, much greater data-storing capacity is required for optical recording mediums. One way to achieve this is to make the address region Z2 as short as possible in the conventional disk described above, thereby increasing the ratio of the data-storing regions Z1 in the tracks.

However, the conventional information pits 90 are length-modulated, as stated above, and the two edges (leading edge and trailing edge) of each pit 90 only serve as a switching point between 0 and 1 in the binary system, whereby each information pit 90 cannot carry much information. Consequently, the address region Z2 tends to be long, whereas the data-recording regions tend to be shortened (deterioration of disk format utility).

In the conventional disk, the pitch between adjacent tracks T is made small for increasing the data-storing density. In this situation, as shown in FIG. 20, the information pits 90 in a first group Ga and a second group Gb are arranged serially in the track-extending direction in a manner such that the pits 90 of the first and the second groups Ga, Gb are staggered in the tracking direction by a distance Lp. Unfavorably, this arrangement is also a cause for the increased length of the address region Z2 (and hence the deterioration of disk format utility).

SUMMARY OF THE INVENTION

The present invention has been proposed under the circumstances described above. It is, therefore, an object of the present invention to improve the format utility of an optical data-storing medium, thereby increasing the data-storing capacity of the medium.

According to a first aspect of the present invention, there is provided an optical storage medium that includes: a plurality of tracks; and a plurality of information pits arranged in the tracks and designed to produce reflection light upon irradiation of a light beam. The information pits are disposed in a matrix layout so that the reflection light includes at least four diffracted rays. Among the information pits, a selected pit is offset from a first reference point in both a track direction and a tracking direction. The selected pit carries information indicated by the position of the selected pit relative to the first reference point.

With the above arrangement, one information pit can carry more pieces of information than is conventionally possible. Thus, the length of the address regions can be shortened, which is advantageous to improving the disk format utility. As a result, the storage capacity of the disk will be increased. According to the present invention, the optical storage medium can be a ROM in which all the data is stored by information pits.

Preferably, the information pits may be disposed on a first line or second line slant with respect to the track direction and the tracking direction.

Preferably, the first line and the second line may be perpendicular to each other.

Preferably, a plurality of offset positions may be predetermined around the first reference point. The selected pit is placed at one of the offset positions.

Preferably, the tracks may be divided into a plurality of sectors each including an address region and a data-recording region. The information pits are arranged in the address region.

Preferably, the data-recording region may be formed with a land and a groove which are juxtaposed in the tracking direction. Data is written to at least one of the land and the groove.

Preferably, each sector may include a reference data region provided with a plurality of reference pits used for tracking control and generation of a clock signal.

Preferably, the reference pits may be arranged to produce reflection light including at least four diffracted rays upon irradiation of a light beam. Each of the reference pits is placed at a second reference point.

Preferably, each reference pit may be surrounded by at least four other reference pits. These four reference pits define a center (e.g. center of gravity) which coincides with the second reference point.

Preferably, the information pits may be divided into a first group and a second group which are juxtaposed in the track direction. The information pits of the first group are staggered with the information pits of the second group in the tracking direction.

According to a second aspect of the present invention, there is provided an optical information processing apparatus including: an optical storage medium provided with a plurality of pits to produce reflection light upon irradiation of light; a light source that irradiates the optical storage medium; and an optical detector that detects the reflection light. The reflection light includes four interference regions separated in both a track direction and a tracking direction. The optical detector is provided with four detection areas that detect light in the interference regions. The relative position of each pit with respect to a reference point is discerned based on intensity of light detected by the detection areas.

Preferably, the apparatus may further include a signal processor that discerns the relative position of each pit. The signal processor is designed to reproduce digital information of each pit based on the relative position of the pit.

Preferably, the optical detector may be provided with a non-detection area surrounded by the four detection areas.

Preferably, the signal processor may generate a radial push-pull signal and a tangential push-pull signal. The radial push-pull signal corresponds to the difference in light intensity of the interference regions in the tracking direction, while the tangential push-pull signal corresponds to the difference in light intensity of the interference regions in the track direction. The signal processor discerns the relative position of each pit with respect to the reference point based on the radial push-pull signal and the tangential push-pull signal.

Preferably, in the above apparatus, the plurality of pits may include a reference pit placed at a predetermined reference position. The signal processor generates a clock signal based on reflection light from the reference pit. Further, the signal processor samples the radial push-pull signal and the tangential push-pull signal in synchronism with the clock signal.

Preferably, the signal processor may detect a tracking error based on the difference in intensity of light detected by the optical detector when the reference pit is irradiated by a light beam.

Preferably, the signal processor may generate a tracking error signal by sampling the radial push-pull signal in synchronism with the clock signal.

Preferably, the signal processor may perform coordinate conversion with respect to the coordinates of each pit.

Preferably, the signal processor may remove an off-tracking component from the radial push-pull signal before performing the coordinate conversion.

Other features and advantages of the present invention will become apparent from the detailed description given below with reference to the accompanying drawings.

BRIEF DESCRIPTION OF THE DRAWINGS

FIGS. 2A~2D show several examples of pit arrangement for the optical disk;

FIGS. 2E~2H show the pattern of reflection rays resulting from the pit arrangements of FIGS. 2A~2D;

DETAILED DESCRIPTION OF THE PREFERRED EMBODIMENT

The preferred embodiments of the present invention will be described below with reference to the accompanying drawings.

Reference is first made to FIGS. 1~6 illustrating a magneto-optical disk D according to a first embodiment of the present invention. As shown in FIG. 1A, the disk D is provided with tracks T for recording data. The tracks T may be provided on an upper or lower side of the disk D or both. As shown in FIG. 1B, the tracks T include address regions A1, data-recording regions A2 and reference data regions A3. These regions are arranged in the track-extending direction Tc (simply called "track direction" below), which is perpendicular to the tracking direction Tg. In an address region A1, a plurality of information pits 1 are provided in a matrix layout. As seen from the figure, any of the information pits 1 is disposed on a slant line L1 or another slant line L2. These lines L1 and L2 are not parallel with the track direction Tc nor the tracking direction Tg. The line L1 may be perpendicular to the line L2. In a data-recording region A2, a plurality of lands L and grooves G are provided. The lands L and the grooves G are different in height in the thickness direction of the disk D. In a reference data region A3, a plurality of pits (called "reference pits" below) 2 are provided. The reference pits 2 and the above information pits 1 correspond in position to the tracks T in the tracking direction Tg. For example, the pits 1, 2 disposed on the lowermost line La correspond to the lowermost track Ta, and likewise, the pits 1, 2 disposed on the next line Lb (above the line La) correspond to the next track Tb (above the track Ta).

The writing of data to the disk D is performed in accordance with the land-groove method, whereby the lands L and the grooves G are both used for writing data. The reference sign M in FIG. 1A refers to a mark which is recorded in the region A2 by e.g. magnetic field modulation. According to the present invention, however, only the grooves G may be used for data storage in order to prevent the crosstalk between adjacent tracks T.

Figure 1A:
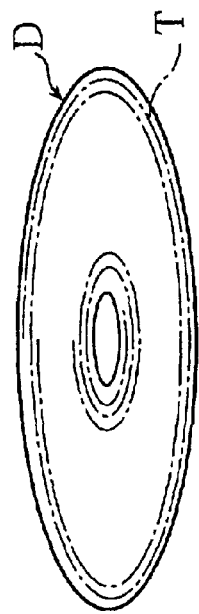
FIG. 1A shows a general appearance of an optical disk embodying the present invention.
Figure 1B:
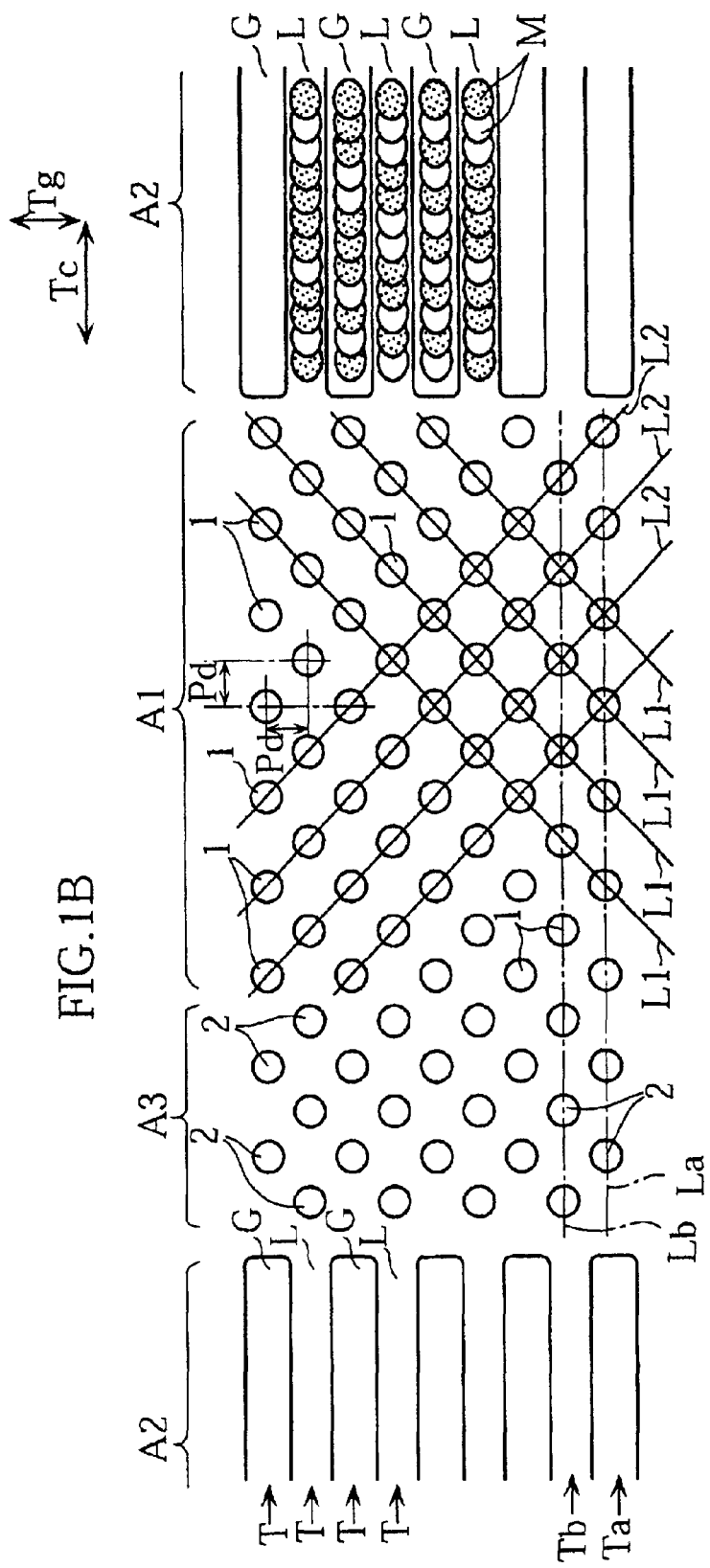
FIG. 1B is an enlarged plan view showing the principal structure of the optical disk.
Figure 3A:
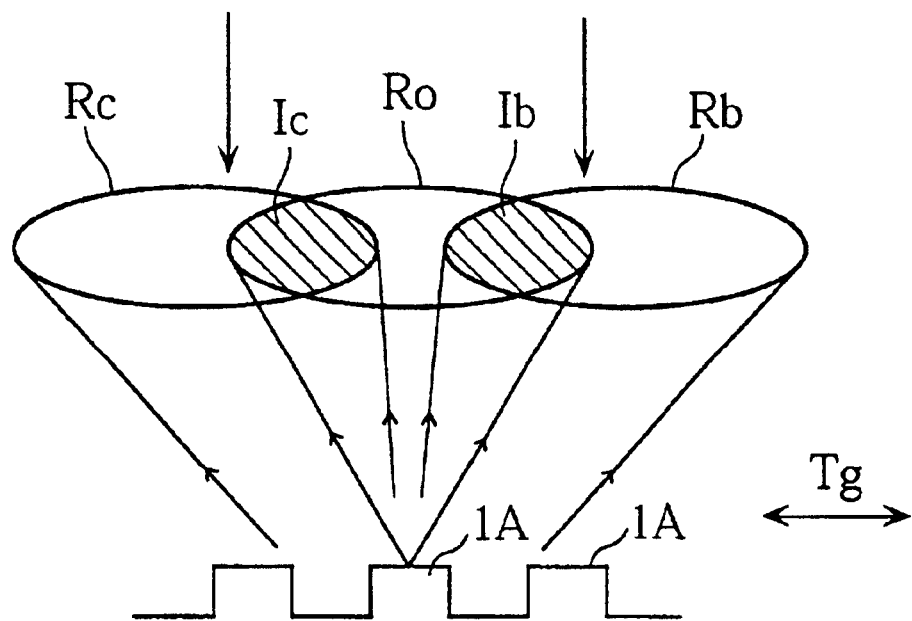
FIGS. 3A and 3B illustrate reflection rays for the optical disk.
Figure 3B:
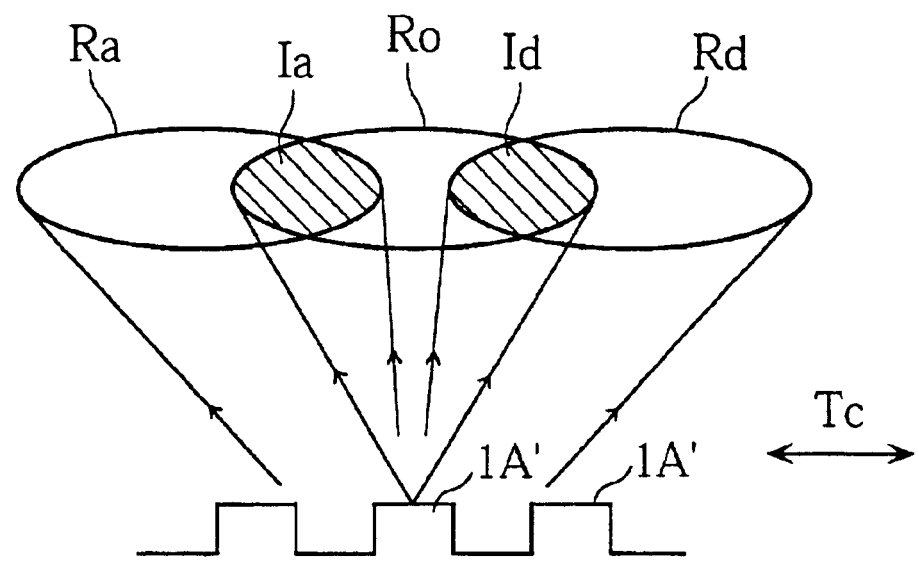

As seen from FIGS. 1B and 3A, each of the information pits 1 in the region A1 is a projection having a circular cross section. According to the present invention, however, the pits 1 may have a rectangular cross section and/or may be recessed. The information pits 1 are arranged so that upon irradiation of a laser beam they will produce four reflection rays interfering with each other. This feature is significant for the present invention, as will be described below.

Figure 21:
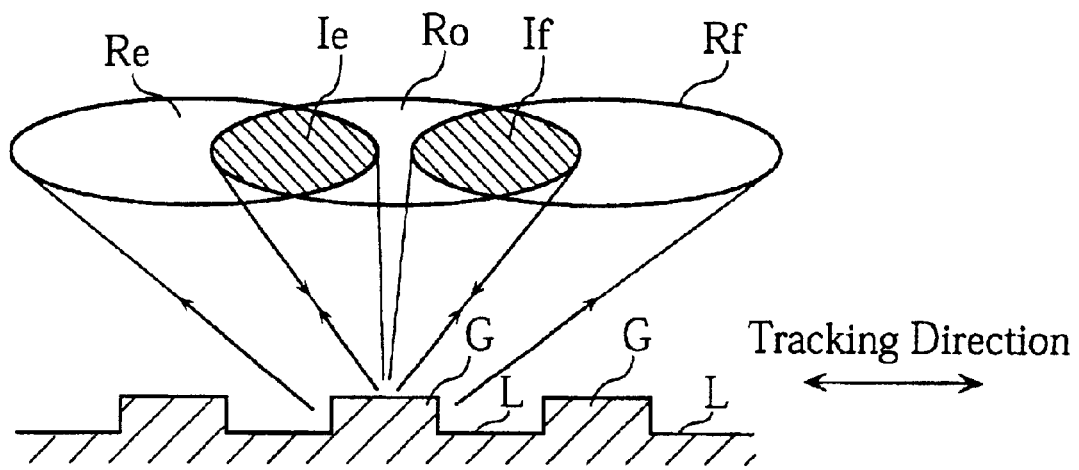
FIG. 21 illustrates how reflection light is produced on the conventional disk.

Consideration is first given to pits 1A shown in FIG. 2A. As illustrated, the pits 1A are arranged at small intervals Pa in the tracking direction Tg. Each pit 1A is elongated in the track direction Tc. When the pits 1A are irradiated by a laser beam converging through an objective lens (not shown), a 0-order reflection ray Ro and two 1-order reflection rays Rb, Rc are generated, as shown in FIG. 3A. The 0-order reflection ray Ro interferes with the 1-order reflection rays Rb and Rc, thereby producing interference rays Ib and Ic lined in the tracking direction Tg, as in the conventional case described with reference to FIG. 21.

When the pitch Pa (FIG. 2A) is equal to $\lambda/NA$ ($\lambda$ represents the wavelength of the laser beam; NA represents the numerical aperture of the unillustrated objective lens), the 1-order reflection rays Rb and Rc circumscribe each other, as shown in FIG. 2E. However, when a smaller pitch Pb is employed (FIG. 2B), the two reflection rays Rb and Rc are spaced away from each other, as shown in FIG. 2F, and thus the interference rays Ib and Ic become thinner. The pitch Pb is $(1/\sqrt{2})$ of the pitch Pa.

Referring now to FIG. 2C, the elongated pits 1A of FIG. 2B are divided into square pits 1A' that are arranged in a matrix layout. The pitches of the pits 1A' in the track direction Tc and the tracking direction Tg are both equal to Pb. When a laser beam strikes upon the pits 1A', two 1-order reflection rays Ra and Rd are generated in addition to the above-mentioned 1-order reflection rays Rb and Rc. The new reflection rays Ra and Rd are lined in the track direction Tc. In this situation, the 0-order reflection ray Ro interferes with the four 1-order reflection rays Ra~Rd, thereby producing four interference rays Ia~Id, as shown in FIG. 2G. The interference rays Ia and Id are lined in the track direction Tc (see FIG. 3B), while the interference rays Ib and Ic are lined in the tracking direction Tg.

The pits 1A' shown in FIG. 2D are the same as the pits shown in FIG. 2C except that they are rotated clockwise (see the arrow N1 in FIG. 2C) through 45°. Accordingly, the interference rays Ia~Id are also rotated clockwise through the same angle, as shown in FIG. 2H.

In the situation of FIG. 2D, the pitch Pc in the tracking direction Tg is $(1/\sqrt{2})$ of the pitch Pb shown in FIG. 2C. With the smaller pitch Pc (which is half the pitch Pa), the pitch of the tracks T (see FIG. 1B) in the tracking direction Tg can also be smaller. This is advantageous to increasing the data storage capacity of the disk D, though the present invention is not limited to this.

Figure 4:
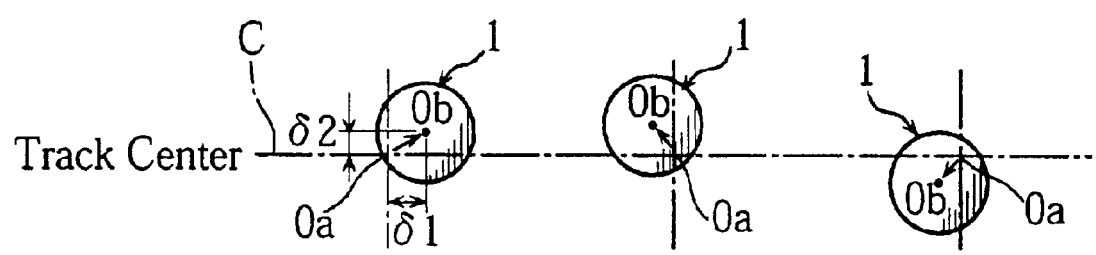
FIG. 4 shows some information pits offset from the reference points.

Referring to FIG. 4, the centers Ob of the respective information pits 1 are offset from the predetermined reference points Oa disposed on the center line of the track. In the illustrated example, the center Ob of the right pit 1 is offset downward and to the left from the relevant reference point Oa. Likewise, the center Ob of the middle pit 1 is offset upward and to the left, while the center Ob of the left pit 1 is offset upward and to the right.

Figure 5:
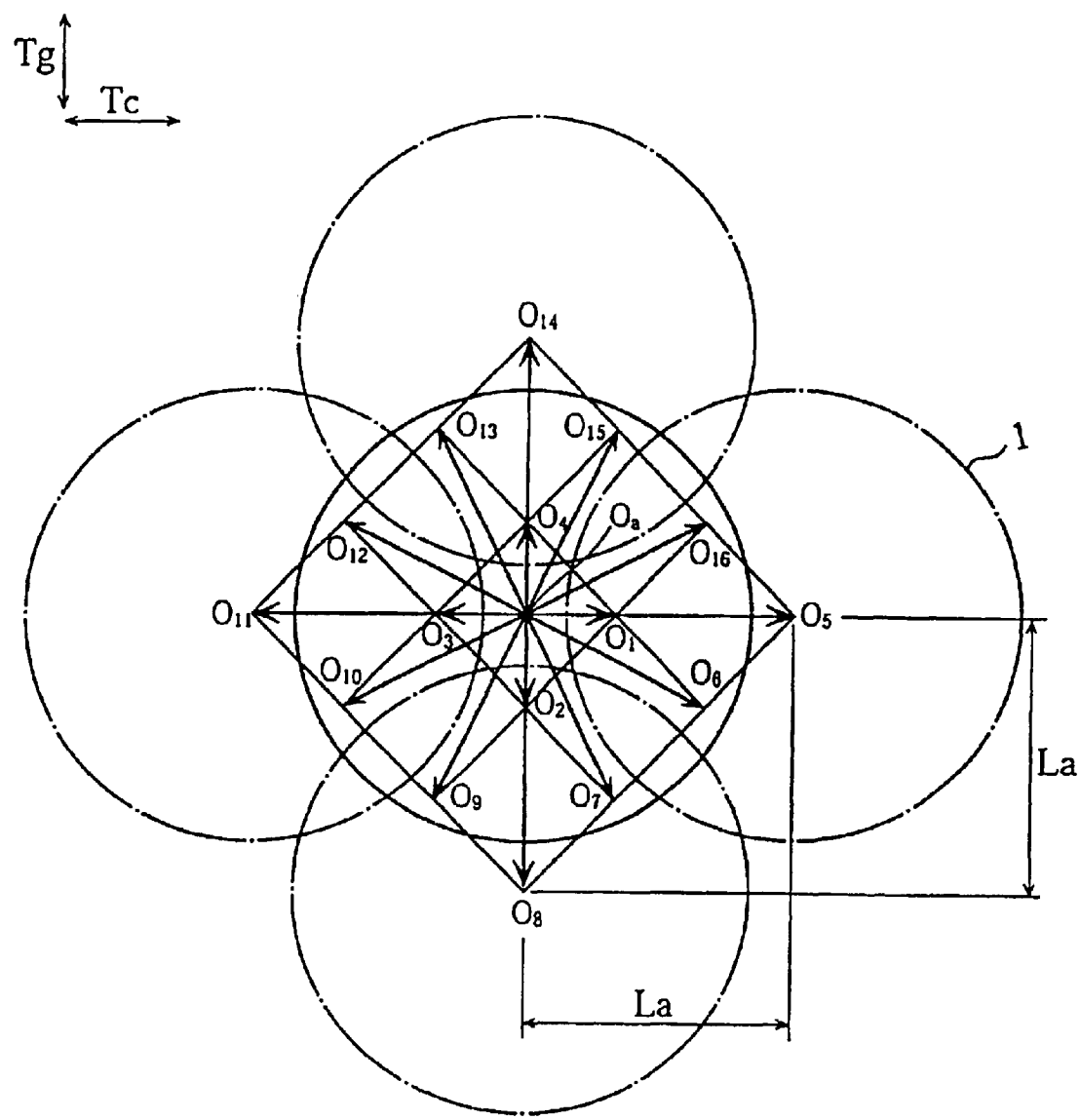
FIG. 5 shows examples of offset positions for the information pit.

Referring to FIG. 5, the center of any information pit 1 may be shifted to a selected one of the positions $O_1 \sim O_{16}$ from the reference point Oa. Each information pit 1 has 4-bit data. Among the 4-bit data, 2-bit data corresponds to the displacement $\delta_1$ in the track direction Tc (see FIG. 4), while the other 2-bit data corresponds to the displacement $\delta_2$ in the tracking direction Tg. As in the conventional optical disk, these pieces of data are pre-coded by EFM (Eight to Fourteen Modulation) or any other logical coding system, so that the data will not contain an unduly long series of 0 or 1.

Figure 16B:
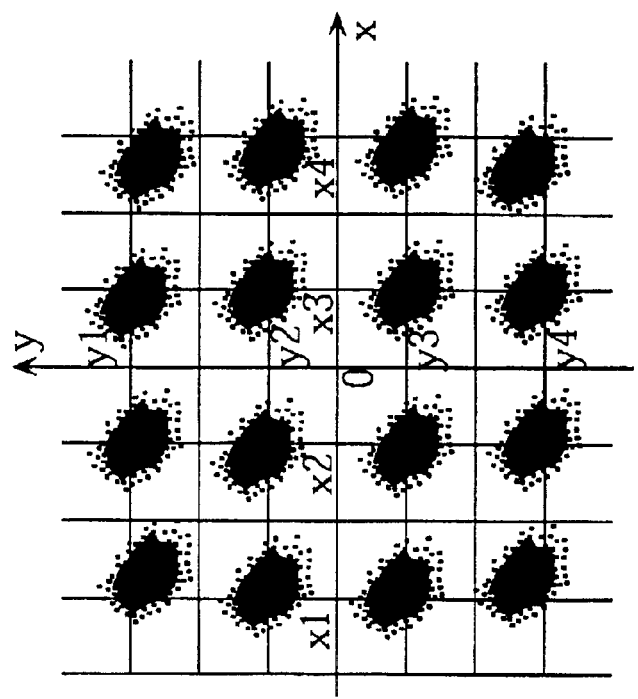
FIGS. 16A~16B and 17 illustrate coordinate conversion performed in the information processing apparatus.
Figure 16A:
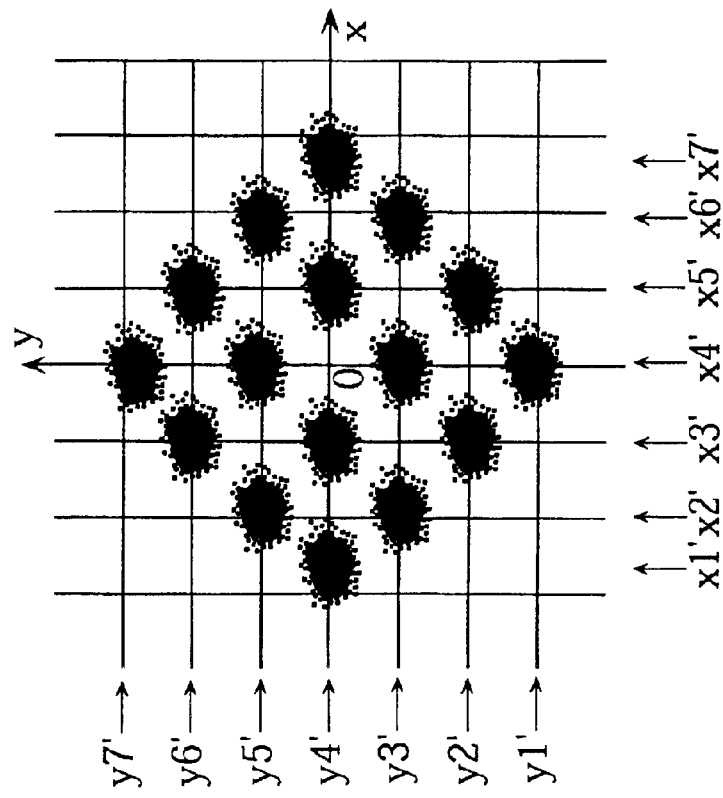

FIG. 16A shows the results of a data reading simulation for information pits 1 shifted to the positions $O_1 \sim O_{16}$. The settings of the simulation are as follows. The pitch Pd (see FIG. 1B) between adjacent pits 1 in the tracking direction Tg and the track direction Tc is 0.541 $\mu$m. The maximum shift La (see FIG. 5) is 0.271 $\mu$m. The numerical aperture of the non-illustrated objective lens is 0.6. In the simulation, an information pit 1 is placed at the positions $O_1 \sim O_{16}$, one after another, and the read-out position of the pit 1 is plotted in an x-y coordinate system. For example, first the pit 1 is placed at the position $O_1$, and the position of the pit 1 is optically detected. The result is plotted in the x-y coordinates. Then, the pit 1 is placed at the position $O_2$. Again, the position of the pit 1 is optically detected, and the result is written in the x-y coordinates. As readily seen, the same procedure is performed for the positions $O_3 \sim O_{16}$.

The graph of FIG. 16A is obtained from the above simulation. The graph shows sixteen dot-clusters distinct from each other in an x-y coordinate system. The clusters correspond to the positions $O_1 \sim O_{16}$. The clear distinction in position between the clusters shows that it is possible to discern which position the information pit 1 is located at.

Figure 6:
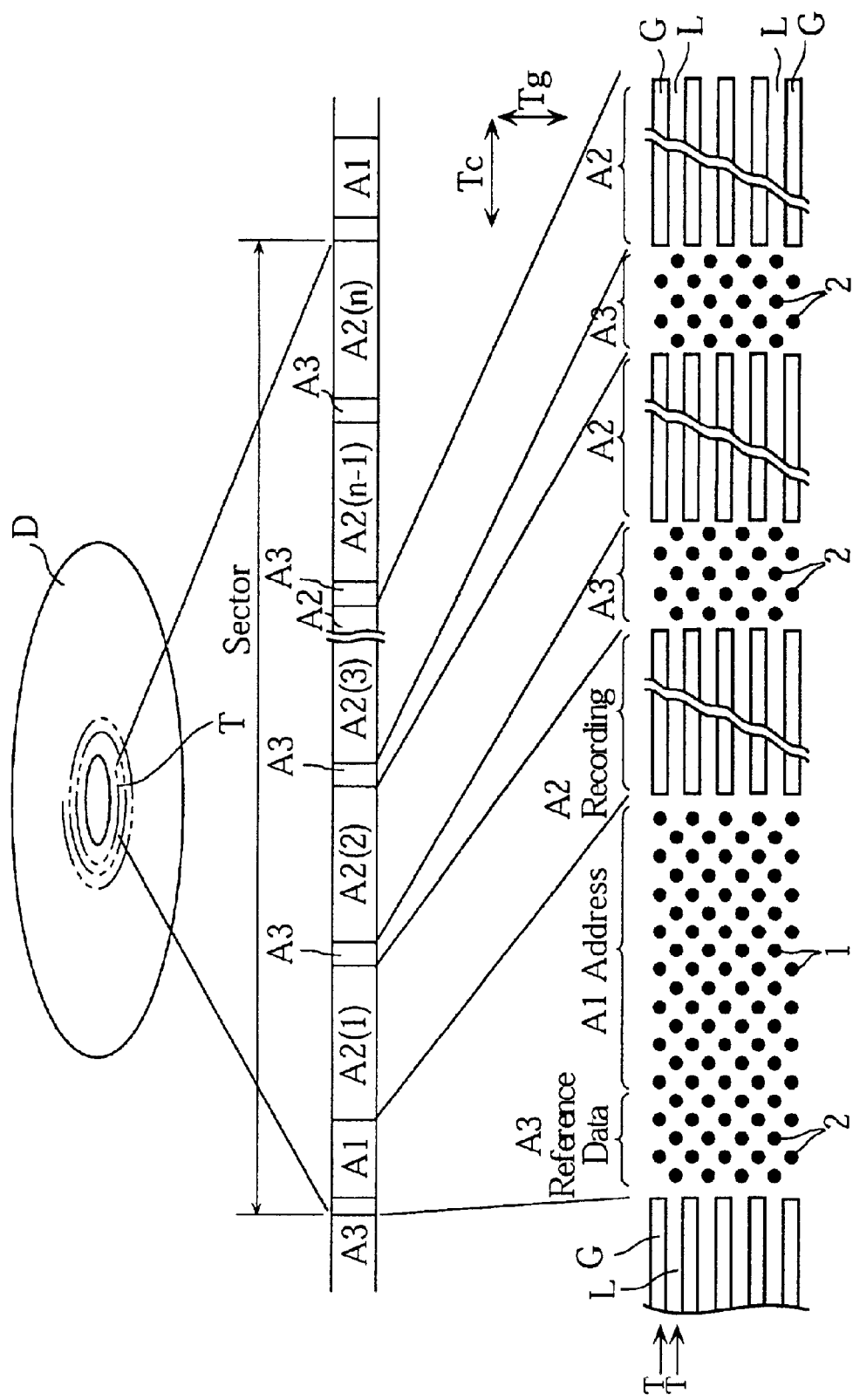
FIG. 6 shows an example of format for the optical disk.

Referring back to FIG. 1B, a plurality of reference pits 2 are provided in the reference data region A3. The reference pits 2 are utilized for generating clock signals and tracking control signals. As in the above-mentioned information pits 1, the reference pits 2 are projections each having a circular cross section, and are disposed in a matrix layout. However, differing from the information pits 1, the reference pits 2 are not offset in any direction from the reference points arranged at regular intervals on the center line of the track T. Thus, the positions of the reference pits 2 can serve as reference points. As shown in FIG. 6, the reference data regions A3 are put at the head of each sector of the disk D and between adjacent data-recording regions A2.

Figure 7:
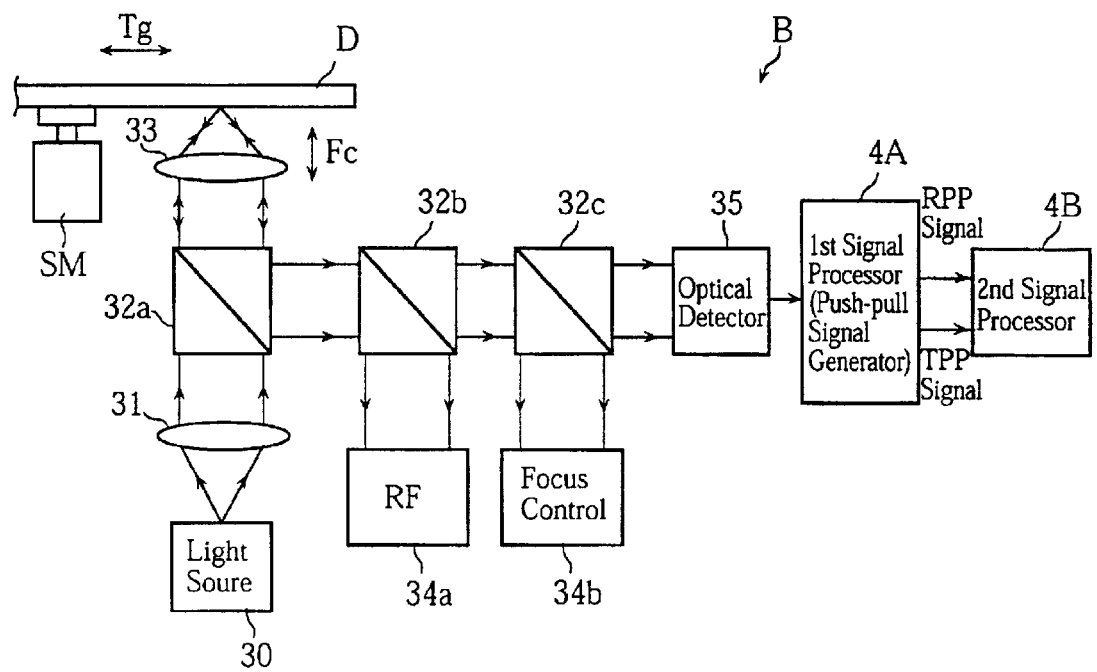
FIG. 7 shows the principal components of an optical information processing apparatus embodying the present invention.

Reference is now made to FIG. 7 showing the principal components of an optical data-processing apparatus embodying the present invention.

The illustrated apparatus B includes a spindle motor SM to rotate the above-described disk D. Further, the apparatus B includes a laser emitting unit or light source 30, a collimator lens 31, first to third beam splitters 32a~32c and an objective lens 33. The laser beam emitted from the unit 30 is caused to converge by the objective lens 33 to make a laser spot on the recording layer (tracks) of the disk D. The reflection light from the recording layer is split by the beam splitters 32a~32c to enter an RF unit 34a, a focus control unit 34b and an optical detector 35. The reflection light from the data-recording regions A2 contains RF signals. Based on these RF signals, the RF unit 34a reproduces information written in the data-recording regions A2. In the focus control unit 34b, the above reflection light is used for determining whether or not a focus error has occurred. Upon detection of an focus error, the focus control unit 34b drives an actuator (not shown) so that the objective lens 33 is moved in the focus control direction Fc to correct the focus error.

Figure 8:
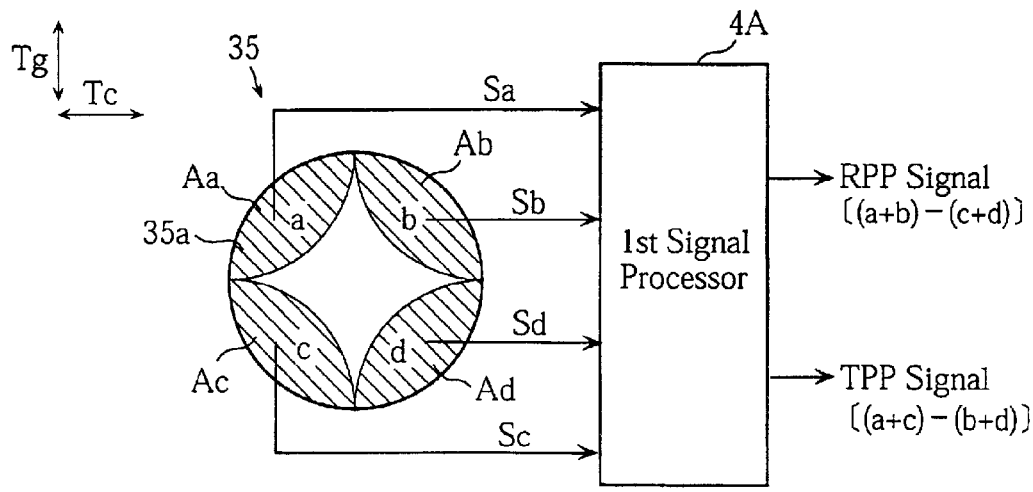
FIG. 8 illustrates an optical detector used for the information processing apparatus.

Referring to FIG. 8, the optical detector 35 includes a light receiving surface 35a for detection of light. The surface 35a has a circular configuration whose diameter is substantially equal to the diameter of the reflection light to be received. The surface 35a includes four light detection areas Aa~Ad to respectively detect the interference rays Ia~Id shown in FIG. 2H. When reflection light strikes upon the light detection areas Aa~Ad, a current is generated in accordance with the amount of the detected light. The thus obtained current is then converted into a detection signal (Sa~Sd) by an non-illustrated converter. The detection signal has a voltage level corresponding to the amount of the detected light.

With the above arrangement, when the address regions A1 and the reference data regions A3 are irradiated by the laser beam, it is possible to know the intensity of the respective interference rays Ia~Id based on the detection signals Sa~Sd. When the data-recording regions A2 are irradiated by the laser beam, the reflection light contains two interference rays, as shown in FIG. 2E or 2F. In this situation again, the two interference rays can be detected by the four detections areas Aa~Ad.

As shown in FIG. 8, the detection signals Sa~Sd are inputted into the first signal processor 4A. Based on these signals, the signal processor 4A generates a radial push-pull signal ("RPP signal") and a tangential push-pull signal ("TPP signal"). Supposing that the voltage levels of the detection signals Sa, Sb, Sc and Sd are represented by a, b, c and d, respectively, the RPP signal has a voltage level of {(a+b)−(c+d)}. As readily seen from this formula, the RPP signal has 0 voltage when (a+b)=(c+d), or a positive voltage when (a+b)>(c+d) or a negative voltage when (a+b)<(c+d).

When the RPP signal has 0 voltage, this means that the total intensity of the interference rays Ia and Ib ("Ia~Ib intensity") is equal to the total intensity of the other interference rays Ic and Id (Ic~Id intensity"). When the RPP signal has a positive voltage, the Ia~Ib intensity is greater than the Ic~Id intensity. When the RPP signal has a negative voltage, the Ia~Ib intensity is smaller than the Ic~Id intensity.

As stated above, the bias condition of the reference ray intensity in the track direction Tc can be determined by monitoring the voltage level of the RPP signal. The amount of intensity bias increases with the offset amount of the information pit 1 from the reference point Oa. Thus, based on the RPP signal, it is possible to know the offset condition of the information pit 1 in the tracking direction Tg.

The TPP signal, on the other hand, has a voltage level of {(a+c)−(b+d)}. Thus, based on the TPP signal, it is possible to know the offset condition of the information pit 1 in the track direction Tc.

Reference is now made to FIGS. 9A~14B illustrating the condition of the reflection light produced when a laser beam irradiates information pits 1 or reference pits 2. FIGS. 9B, 10B, 11B, 12B, 13B and 14B show three-dimensional graphs representing the intensity distribution of the reflection light.

As noted above, the information pit 1 and the reference pit 2 are different in that the former is offset from the predetermined reference point, while the latter is placed on its relevant reference point. However, the reflection light pattern resulting from the pit 1 and the pit 2 can be discussed by using the same model. Thus, the following explanation of the reflection light intensity pattern is based on the illustrated model consisting of a target pit 10 and four other pits 11 disposed regularly around the target pit 10. In the model, the target pit 10 represents the information pit 1 or reference pit 2.

Figure 9A:
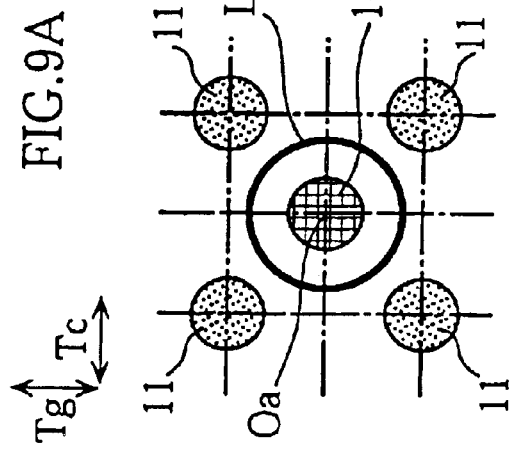
FIGS. 9A and 9B illustrate a pit arrangement and light intensity distribution resulting from the pit arrangement.
Figure 9B:
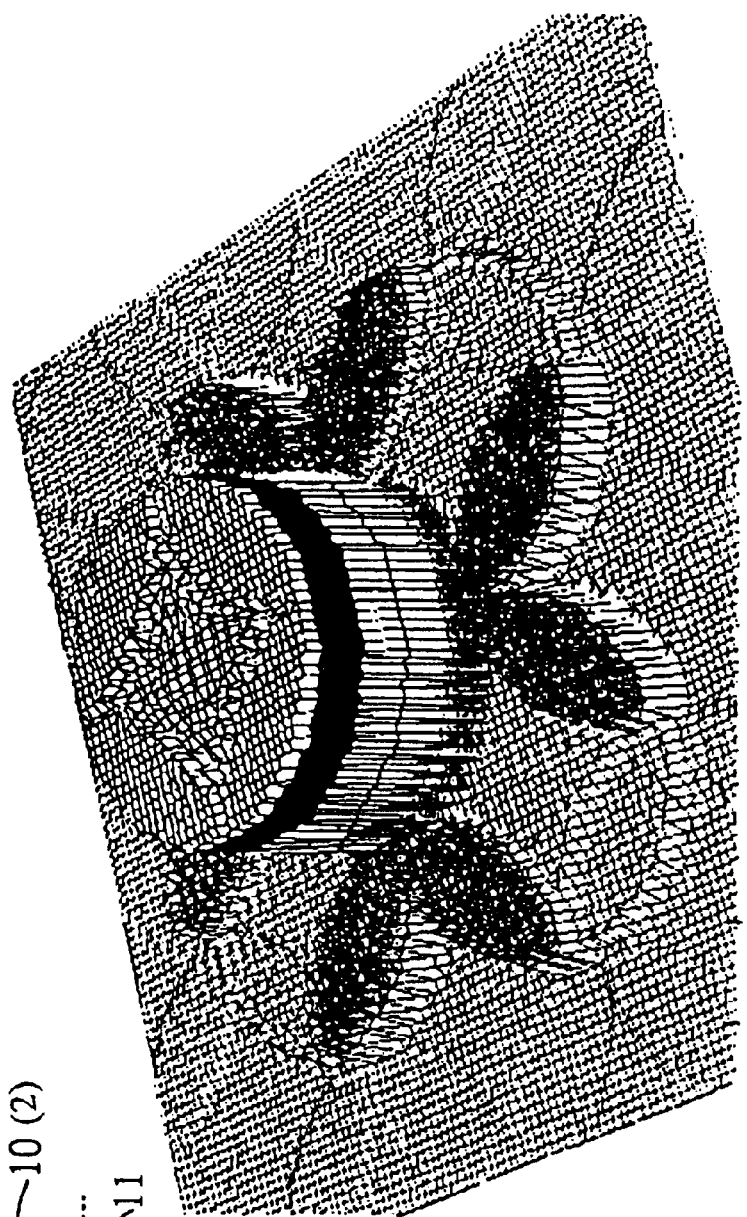

In FIG. 9A, the center of the target pit 10 coincides with the reference point Oa which is defined as the center (centroid) of the four surrounding pits 11. Also, the center of the laser spot Ls coincides with the reference point Oa. In this case, as shown by the pattern of FIG. 9B, the intensity of the reflection light becomes generally equal in places (see the flat and level top plane of the central column). This reflection pattern is observed only when the centers of the target pit 10 and laser spot Ls both coincide with the reference point Oa. Therefore, when the pattern of FIG. 9B is detected, it is discerned that the offset amount of the pit 10 relative to reference point Oa is zero and that the center of the laser spot Ls comes onto the reference point Oa.

Figure 10A:
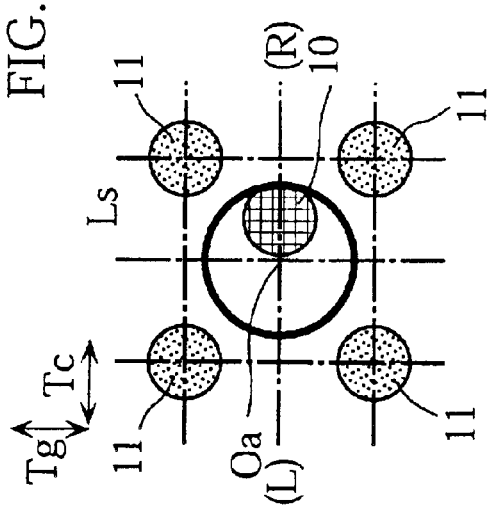
FIGS. 10A and 10B illustrate another pit arrangement and light intensity distribution resulting from the pit arrangement.
Figure 10B:
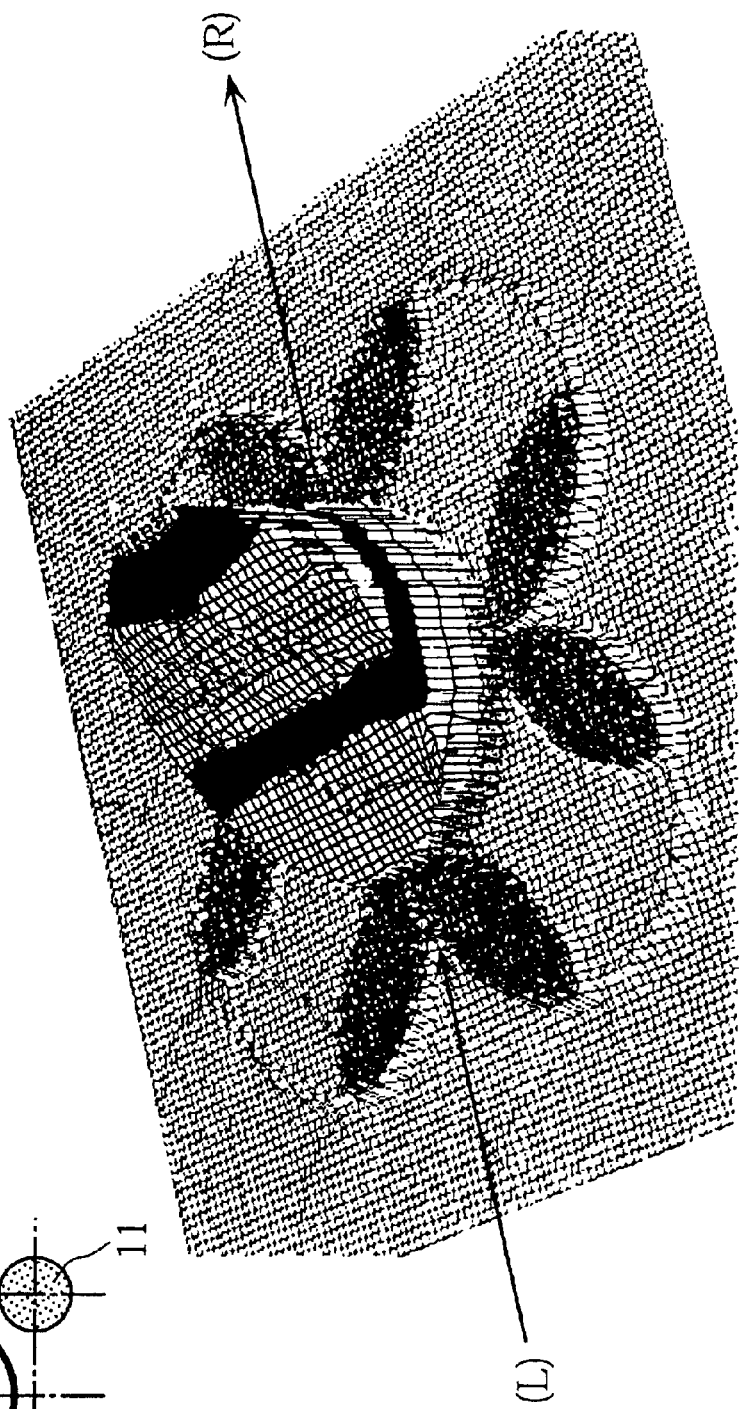

In FIG. 10A, the target pit 10 is offset to the right in the track direction Tc from the reference point Oa, while the center of the laser spot Ls coincides with the point Oa. In this case, the reflection light patter is as shown in FIG. 10B. The top of the central column is generally flat but not level. Specifically, the top inclines in the track direction Tc, becoming higher regularly as proceeding from left (L) to right (R). The gradient of the top becomes greater with the offset amount of the target pit 10. This intensity pattern is observed only when the pit 10 is offset from the reference point Oa and the center of the laser spot Ls coincides with the point Oa. Thus, by analyzing the intensity pattern of FIG. 10B, it is possible to determine the offset amounts of the pit 10 (i.e., the information pit 1 in this case) in the track direction Tc and the tracking direction Tg. Precisely, the offset determination is done through the sampling of the RPP signal and TPP signal when the pattern of FIG. 10B is observed.

Figure 11A:
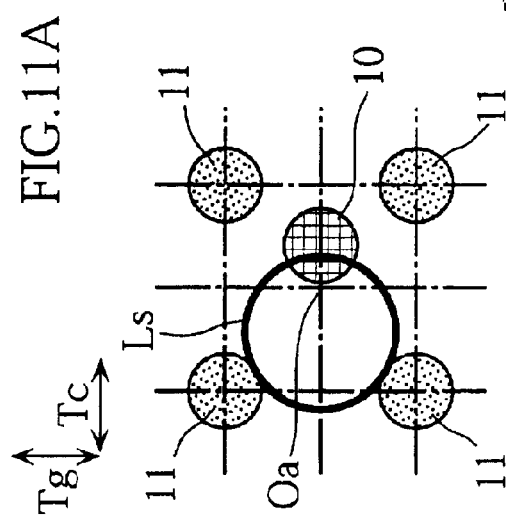
FIGS. 11A and 11B illustrate another pit arrangement and light intensity distribution resulting from the pit arrangement.
Figure 11B:
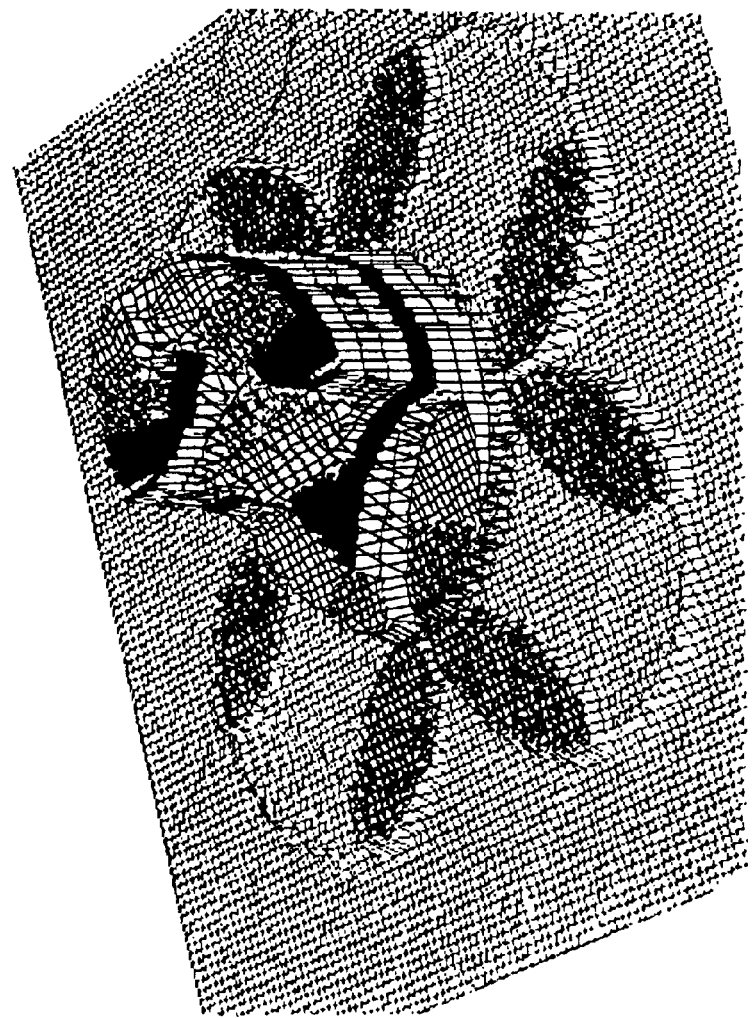
Figure 12B:
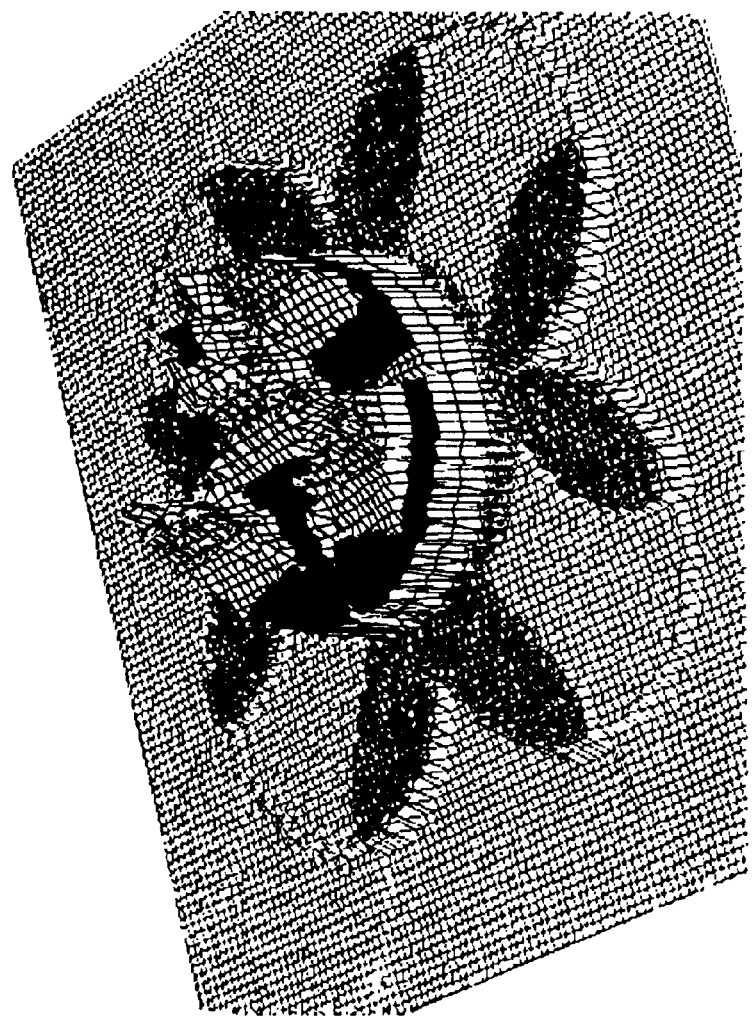
FIGS. 12A and 12B illustrate another pit arrangement and light intensity distribution resulting from the pit arrangement.
Figure 12A:
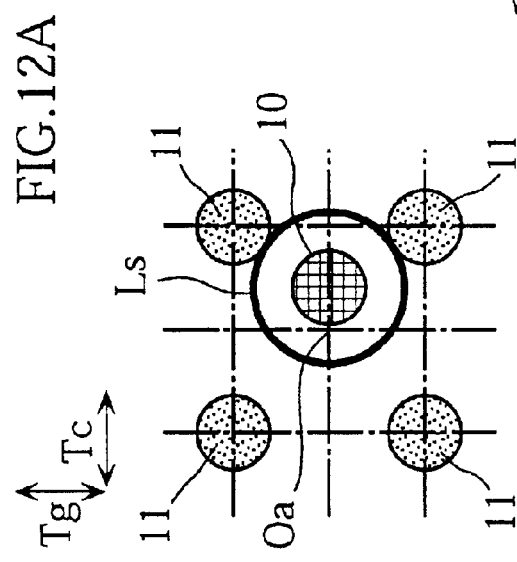
Figure 13A:
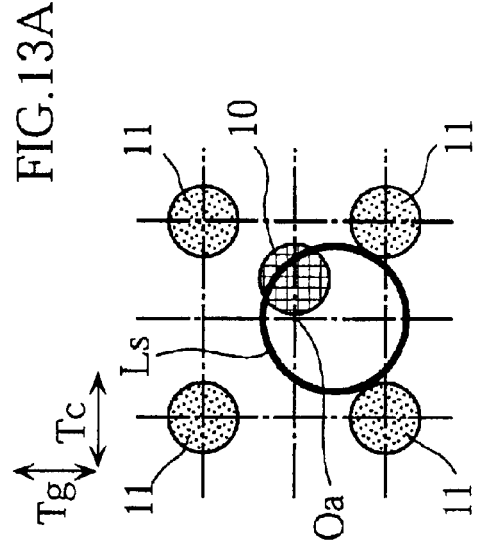
FIGS. 13A and 13B illustrate another pit arrangement and light intensity distribution resulting from the pit arrangement.
Figure 13B:
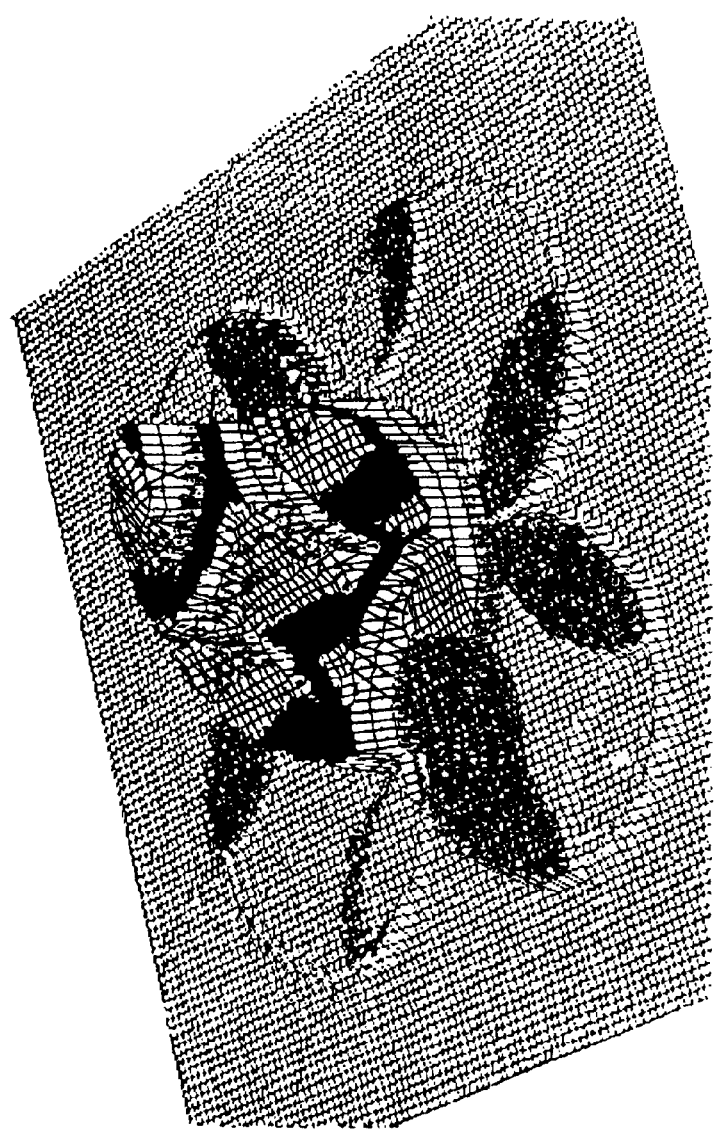

In contrast to the above two cases, the examples shown in FIGS. 11A, 12A and 13A illustrate instances where the center of the laser spot Ls does not coincide with the reference point Oa. In these situations, the light intensity distribution produces a central level portion where no great intensity difference is observed. On the other hand, in the circumferential portion of the distribution pattern (that is, the portion of the four interference rays), rather great (and maybe irregular) differences in intensity distribution are observed.

As seen from the above, the appearance of an irregular intensity difference in the four interference regions indicates that the centers of the laser spot. Ls and pit 10 are both offset from the reference point Oa.

In this connection, the optical detector 35 shown in FIG. 8 is provided with four detection areas Aa~Ad, as previously noted. These detection areas, however, are arranged edgewise of the light receiving surface 35a, so that a non-detection area is provided at and about the center of the surface 35a. With such an arrangement, the optical detector 35 can mostly receive the four interference rays, but not much of the non-interference light (which corresponding to the central level portion of the intensity distribution patterns). Thus, it is possible to accurately detect the difference in intensity of light among the four interference rays.

Figure 14A:
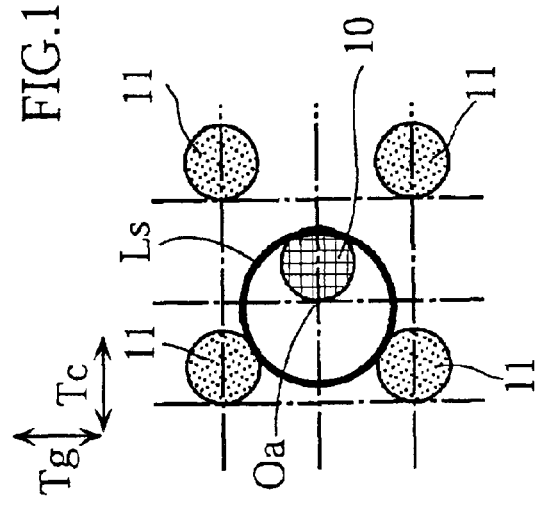
FIGS. 14A and 14B illustrate another pit arrangement and light intensity distribution resulting from the pit arrangement.
Figure 14B:
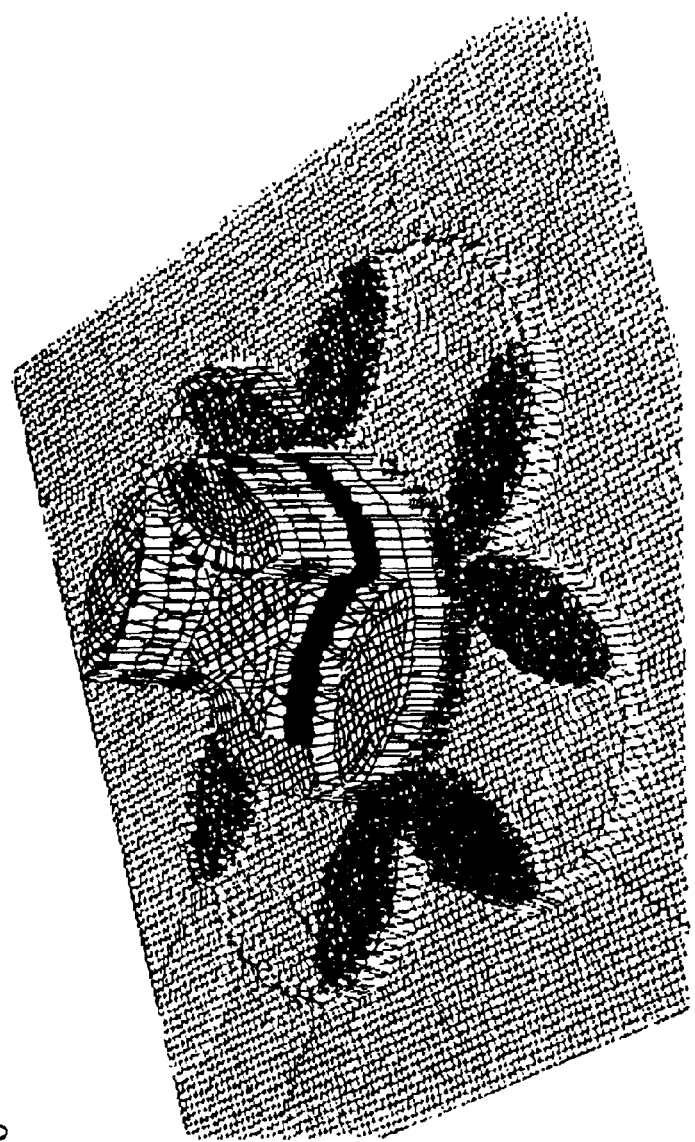

In the case shown in FIG. 14A, the center of the laser spot Ls coincides with the reference point Oa, but the target pit 10 and the four surrounding pits 11 are shifted in the same direction by the same distance. Thus, the case of FIG. 14A is equivalent to a situation where the laser spot Ls is offset from the reference point Oa in the pit layout shown in FIG. 9A.

Figure 15:
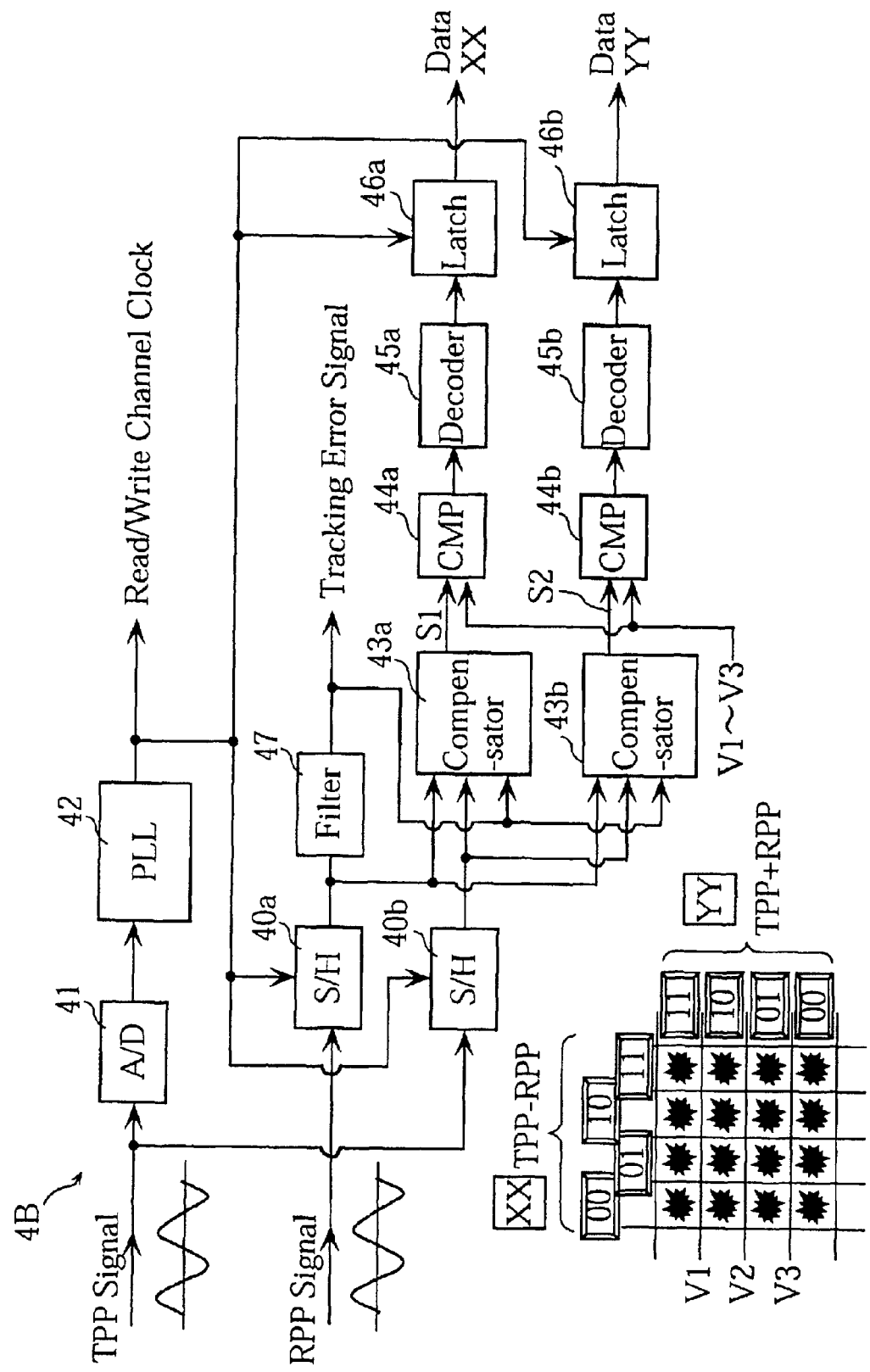
FIG. 15 shows principal components of the second signal processor of the information processing apparatus shown in FIG. 7.

Referring back to FIG. 7, the RPP signal and the TPP signal are sent to a second signal processor 4B from the first signal processor 4A. The second processor 4B reproduces the data of the information pit 1 on the basis of the RPP signal and the TPP signal. The basic structure of the second processor 4B is shown in FIG. 15. As illustrated, the RPP signal is inputted into a first sample holding circuit 40a, while the TPP signal is inputted into a second sample holding circuit 40b and an A/D converting circuit 41 (and further into a PLL circuit 42). The PLL circuit 42 generates clock signals based on TPP signals which are obtained when the reference pits 2 in the regions A3 are irradiated by a laser beam. The thus generated clock signals serve as the clock for a data-reading/writing channel, while also being inputted into the two sample holding circuits 40a, 40b. In synchronism with the clock signal, the sample holding circuits 40a, 40b perform sampling with the RPP signal and the TPP signal. The sampling operation, as noted above with reference to FIGS. 9~14, is timed to the moment of coincidence of the center of the laser spot Ls with the reference point Oa.

The RPP signal, sampled by the first sample holding circuit 40a, carries offset information in the tracking direction Tg for the information pit 1 (when the target of the data-reading is the address regions A1). The offset information relates to both the offset amount of the pit 1 in the direction Tg and the vector of the offset (that is, "toward the center of the disk D" or "away from the center"). The sampled signal is inputted into compensation circuits 43a, 43b and a filter 47. The filter 47 removes pit position modulation components and noise from the supplied signal, to provide a tracking error signal. This tracking error signal is also inputted into the compensation circuits 43a, 43b.

The TPP signal, sampled by the second sample holding circuit 40b, carries offset information in the track direction Tc for the information pit 1 (when the target of the data-reading is the address regions A1). The offset information relates to both the offset amount of the pit 1 in the direction Tc and the vector of the offset (that is, in the proceeding direction of the laser beam or in the opposite direction). The sampled signal is inputted into the compensation circuits 43a, 43b.

Based on such RPP and TPP signals, it is possible to determine what position the target information pit 1 is located at. Specifically, the target information pit 1 takes one of the sixteen positions depicted in the x-y coordinates shown in FIG. 16A.

The compensation circuits 43a, 43b map the pit location pattern of FIG. 16A onto a new x-y coordinate system shown in FIG. 16B. The mapping rule is as follows. Supposing that the sampled RPP and TPP signals have voltages $V_{RPP}$ and $V_{TPP}$, respectively, the first compensation circuit 43a generates a signal S1 corresponding to $(K \cdot V_{TPP}+V_{RPP})$ while the second compensation circuit 43b generates a signal S2 corresponding to $(K \cdot V_{TPP}-V_{RPP})$. The coefficient K is equal to 0.95 for example.

Figure 17:
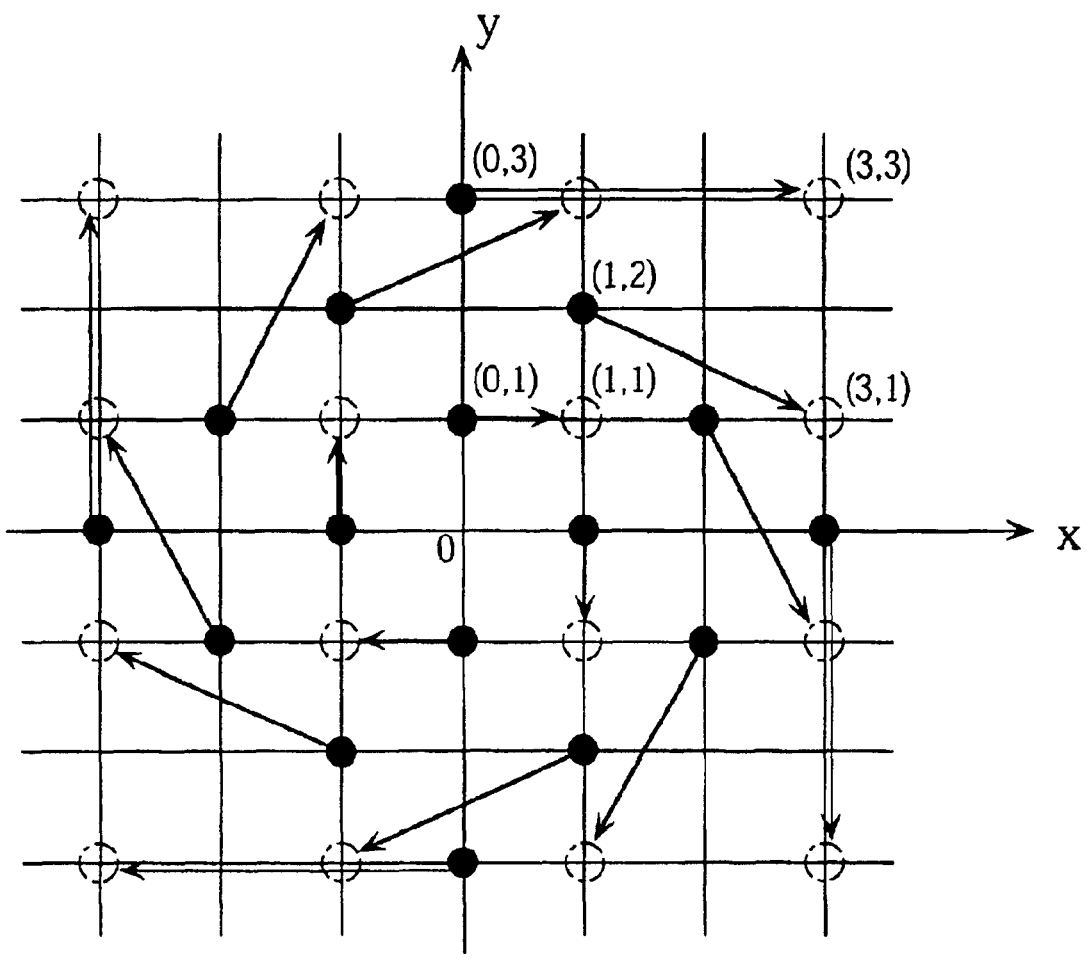

The above operation performed by the compensation circuits 43a and 43b corresponds to a coordinate conversion as shown in FIG. 17. In accordance with the conversion, point (0, 1) is moved to a new point (1, 1), point (1, 2) is moved to a new point (3, 1), and so on. Through this conversion, the sixteen offset positions of the information pit 1 shown in FIG. 16A are converted into the new pattern shown in FIG. 16B. It is advantageous to perform such conversion in order to reduce the amount of data necessary to specify all the sixteen points of the predetermined pit-shift destinations. Specifically, with the conversion performed, only eight numbers (x1~x4 and y1~y4) are needed to describe the positions of all the sixteen points, as shown in FIG. 16B. Without such conversion, fourteen numbers (x1'~x7' and y1'~y7') are required, as shown in FIG. 16A.

Before performing the above coordinate conversion, the compensations circuits 43a and 43b deduct the tracking error signal component from the RPP signal so that correct data will be obtained. To elaborate on this, when the disk D is rotated at high speed, a tracking error can occur due to e.g. eccentricity of the disk. Since the tracking control is performed mechanically by an actuator (follow-up mechanism), it is difficult to eliminate the tracking control error. Accordingly, without taking any precaution, the RPP signal would contain low frequency noise resulting from the eccentricity. According to the present invention, since such noise is precluded by the above-mentioned tracking error signal deduction, correct data can be obtained. The TPP signal, on the other hand, does not particularly need such error correction, since the variation in rotational speed of the disk D is negligible (about 0.1% at most).

Figure 18:
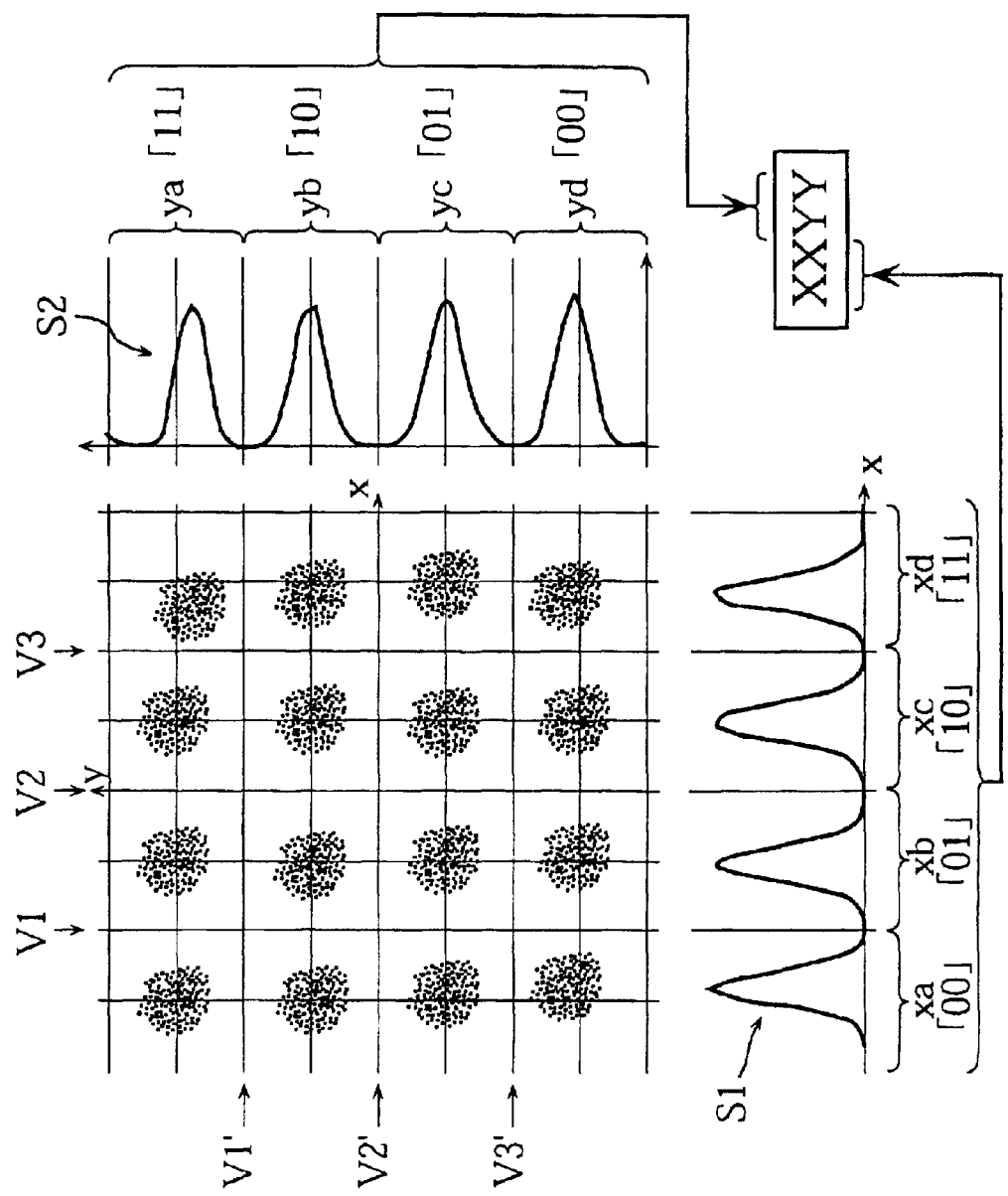
FIG. 18 illustrates how required data is reproduced in the information processing apparatus.

Referring back to FIG. 15, the S1 signal generated at the compensation circuit 43a is inputted into a first comparator 44a and further into a first decoder 45a. Likewise, the S2 signal generated at the compensation circuit 43b is inputted into a second comparator 44b and further into a second decoder 45b. In the first comparator 44a, as shown in FIG. 18, the signal S1 is compared to three reference voltages V1~V3. As a result, it is determined which area the signal S1 belongs to among the four areas xa~xd shown in FIG. 18. The areas xa, xb, xc and xd correspond to data '00', '01', '10' and '11', respectively. Thus, when the signal S1 is found to belong to the area xa for example, it carries data '00'. Likewise, in the second comparator 44b, the signal S2 is compared to reference voltages V1'~V3', and found to belong to either one of the areas ya, yb, yc and yd (shown in FIG. 18) which correspond to data '11', '10', '01' and '00', respectively. Thus, when the signal S2 belongs to the area ya for example, it carries data '11'.

The first and the second decoders 45a, 45b shown in FIG. 15 perform decoding of coded data. The decoded data is outputted from latch circuits 46a and 46b in synchronism with the clock signals generated at the PLL circuit 42. The latch circuits 46a and 46b output 2-bit data or signals XX and YY, respectively. These 2-bit signals are combined to produce 4-bit data, which is carried by a single information pit 1.

The objective lens 33 shown in FIG. 7, as facing the address regions A1 or reference data regions A3, may be moved in the tracking direction Tg to traverse the tracks T. When such movement occurs, the resulting reflection light will contain an ondogram component corresponding to the information pits 1 or reference pits 2. During seek, the information processing apparatus B counts the number of tracks based on the ondogram. Further, the reference pits 2 are not offset from their reference points Oa, as stated above. Thus, based on the reflection light from the reference pits 2, it is possible to determine whether or not the laser beam irradiates the center of the relevant information pit 2. When the laser irradiation deviates from the pit center, the RPP signal can be used to detect the extent and direction (vector) of the deviation in the same way the direction Tg-offset of the information pit 1 can be known. Based on these principles, the processing apparatus B detects the off-tracking amount, namely, deviation amount of the laser beam with respect to the target track. Thus, even when the objective lens 33 is facing regions other than the data-recording regions A2, proper seek and tracking control can be done.

According to the above-described embodiment, a single information pit 1 carries 4-bit data. This is advantageous to improving the data storage density of the address regions A1. Consequently, the address regions A1 can be shortened, while the data-recording regions A3 are lengthened. This contributes to increasing the total data storage capacity of the disk D. Further, in the processing apparatus B, the reproduction of the data carried by each information pit 1 utilizes the RPP signal and the TPP signal. For these two kinds of signals, substantially the same processing is performed in parallel. Specifically, the 4-bit data carried by the information pit 1 contains two pieces of 2-bit data corresponding to the positional modulations in the tracking direction Tg and the track direction Tc. For the two pieces of 2-bit data, modulation and demodulation are performed in the same manner. Accordingly, it is easy to reproduce the data carried by the information pit 1.

Figure 19:
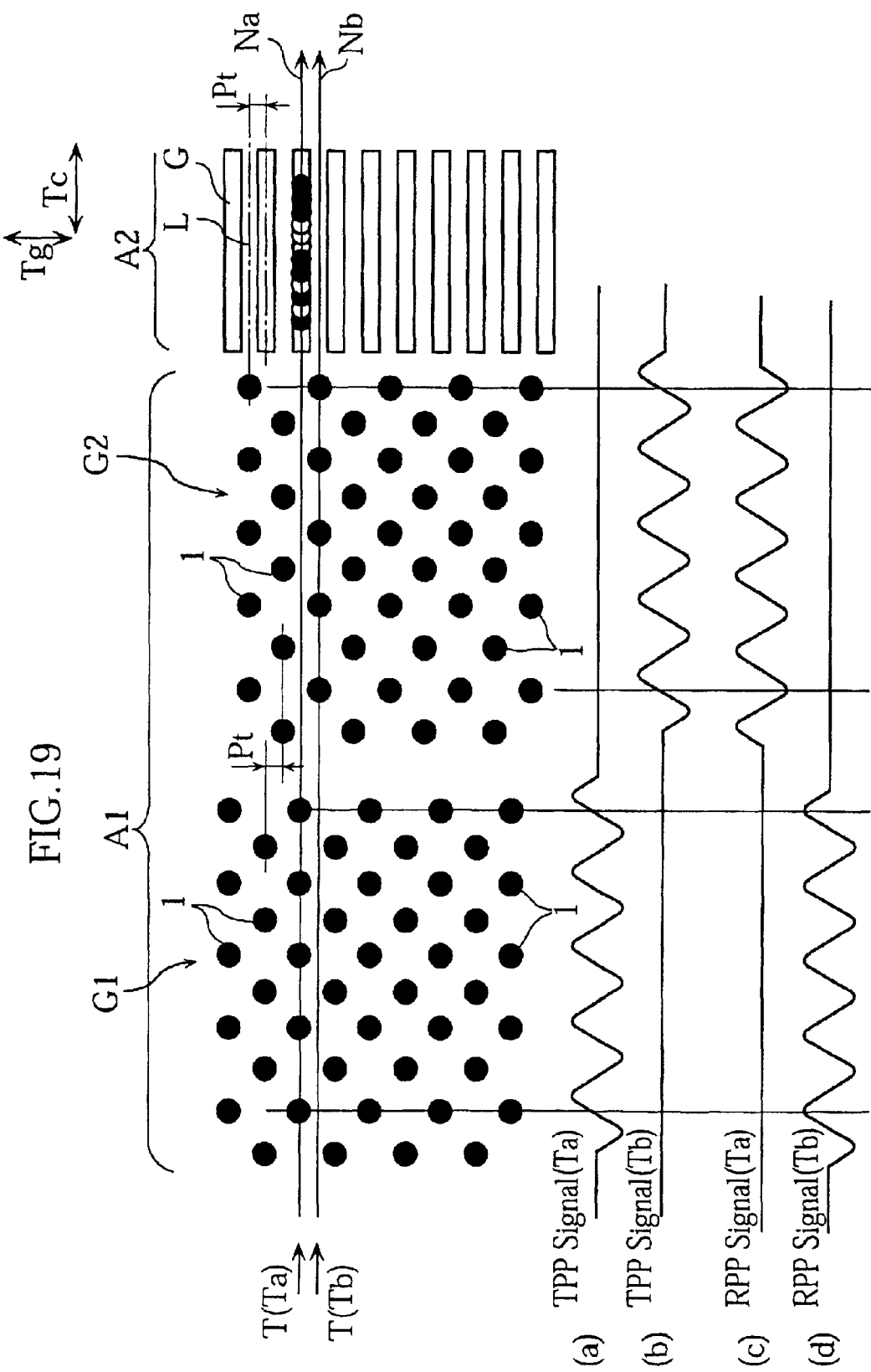
FIG. 19 is a plan view showing another example of pit layout for the optical disk of the present invention.
Figure 20:
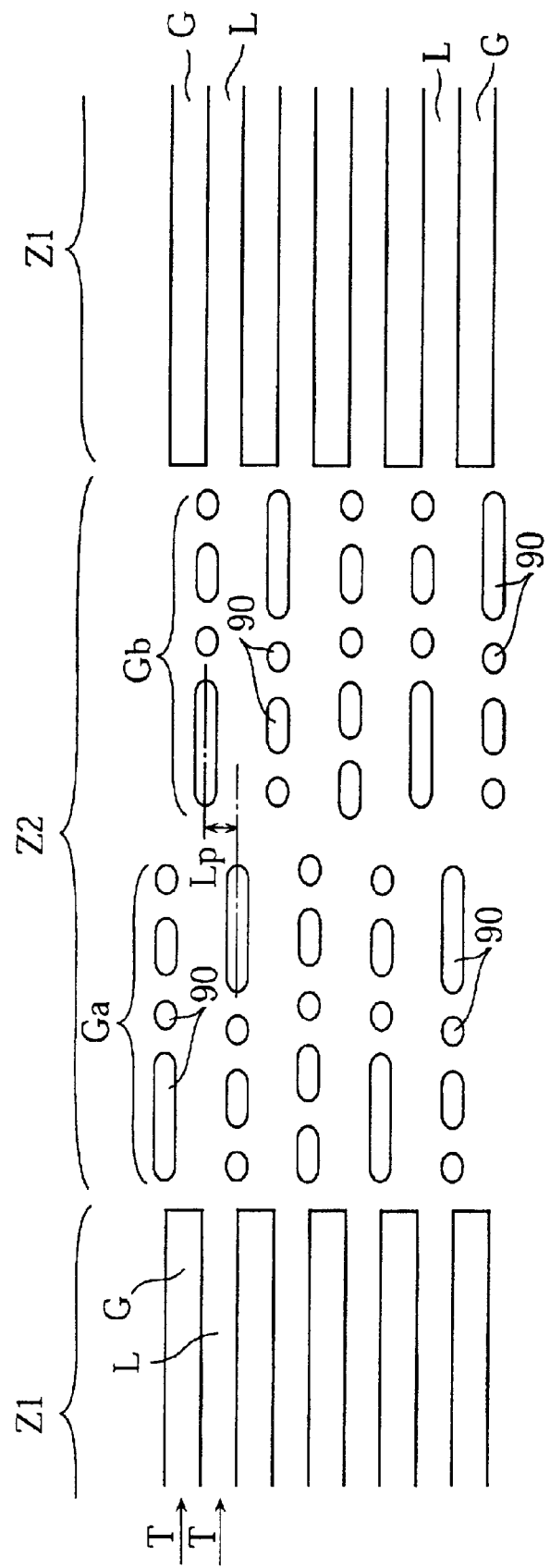
FIG. 20 is a plan view showing the pit layout of a conventional optical disk.

Reference is now made to FIG. 19 illustrating another embodiment of the present invention.

In this embodiment, the address region A1 is formed with a first group G1 of information pits and with a second group G2 of information pits. One group comes before the other in the track direction Tc. The pits 1 in the first group G1 and the pits 1 in the second group G2 are staggered in the tracking direction Tg. The sign Pt refers to the pitch of the stagger.

With such an arrangement, the pitch of the tracks T can be equal to the pitch Pt of the stagger. Specifically, the track pitch Pt can be half of the track pitch of the previous embodiment. Thus, the data storage capacity of the disk is significantly improved.

When data is read out from a track Ta, as indicated by an arrow Na, a TPP signal (a) and an RPP signal (c) are obtained. Then, when data is read out from another track Tb, as indicated by an arrow Nb, different patterns of TPP signal (b) and RPP signal (d) are obtained. As seen from this, each track can be distinguished from the other tracks based on the different of the signal pattern.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An optical storage medium comprising:
a plurality of tracks; and
a plurality of information pits arranged in the tracks and designed to produce reflection light upon irradiation of a light beam, each of the information pits being associated with a first reference point for said each information pit;
wherein the information pits are disposed in a matrix layout so that the reflection light includes at least four diffracted rays; and
wherein a selected pit of the information pits is offset from the associated first reference point in a track direction and a tracking direction, the selected pit carrying information indicated by the offset of the selected pit relative to the associated first reference point.

2. The optical storage medium according to claim 1, wherein the information pits are disposed on a first line or second line slant with respect to the track direction and the tracking direction.

3. The optical storage medium according to claim 2, wherein the first line and the second line are perpendicular to each other.

4. The optical storage medium according to claim 1, wherein a plurality of offset positions are predetermined around the first reference point, the selected pit being placed at one of the offset positions.

5. The optical storage medium according to claim 1, wherein the tracks are divided into a plurality of sectors each including an address region and a data-recording region, the information pits being arranged in the address region.

6. The optical storage medium according to claim 5, wherein the data-recording region is formed with a land and a groove which are juxtaposed in the tracking direction, data being written to at least one of the land and the groove.

7. The optical storage medium according to claim 5, wherein each sector includes a reference data region provided with a plurality of reference pits used for tracking control and generation of a clock signal.

8. The optical storage medium according to claim 7, wherein the reference pits are arranged to produce reflection light including at least four diffracted rays upon irradiation of a light beam, each of the reference pits being associated with and placed at a second reference point for said each reference pit.

9. The optical storage medium according to claim 8, wherein four reference pits are disposed around said each reference pit, the associated second reference point coinciding with a center of the four reference pits.

10. The optical storage medium according to claim 1, wherein the information pits are divided into a first group and a second group which are juxtaposed in the track direction, the information pits of the first group being staggered with the information pits of the second group in the tracking direction.

11. An optical information processing apparatus comprising:
an optical storage medium provided with a plurality of pits to produce reflection light upon irradiation of light;
a light source that irradiates the optical storage medium;
an optical detector that detects the reflection light; and
a signal processor that discerns the relative position of each pit;
wherein the reflection light includes four interference regions separated in a track direction and a tracking direction, the optical detector being provided with four detection areas that detect light in the interference regions;
wherein a relative position of each pit with respect to a reference point is discerned based on intensity of light detected by the detection areas;
wherein the signal processor is designed to reproduce digital information of each pit based on the relative position of said pit; and
wherein the signal processor generates a radial push-pull signal and a tangential push-pull signal, the radial push-pull signal corresponding to a difference in light intensity of the interference regions in the tracking direction, the tangential push-pull signal corresponding to a difference in light intensity of the interference regions in the track direction, the signal processor discerning the relative position of each pit with respect to the reference point based on the radial push-pull signal and the tangential push-pull signal.

12. The apparatus according to claim 11, wherein the optical detector is provided with a non-detection area surrounded by the four detection areas.

13. The apparatus according to claim 11, wherein the plurality of pits include a reference pit placed at a predetermined reference position, the signal processor generating a clock signal based on reflection light from the reference pit, the signal processor sampling the radial push-pull signal and the tangential push-pull signal in synchronism with the clock signal.

14. The apparatus according to claim 11, wherein the signal processor detects a tracking error based on a difference in intensity of light detected by the optical detector when the reference pit is irradiated by a light beam.

15. The apparatus according to claim 13, wherein the signal processor generates a tracking error signal by sampling the radial push-pull signal in synchronism with the clock signal.

16. The apparatus according to claim 11, wherein the signal processor performs coordinate conversion with respect to coordinates of each pit.

17. The apparatus according to claim 16, wherein the signal processor removes an off-tracking component from the radial push-pull signal before performing the coordinate conversion.

* * * * *